(12) United States Patent
Boyle et al.

(10) Patent No.: US 9,253,672 B1
(45) Date of Patent: *Feb. 2, 2016

(54) SYSTEM AND METHOD FOR MEASURING THE QUANTITY, TYPE AND TRANSMISSION QUALITY OF MOBILE COMMUNICATION DEVICES WITHIN A DEFINED GEOGRAPHICAL AREA

(71) Applicant: Joingo, LLC, San Jose, CA (US)

(72) Inventors: Stephen S. Boyle, Lincoln, CA (US); Russell S. Greer, Los Gatos, CA (US); Evan Bigall, Mountain View, CA (US); Thang Dao, San Jose, CA (US)

(73) Assignee: Joingo, LLC, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/275,790

(22) Filed: May 12, 2014

Related U.S. Application Data

(63) Continuation-in-part of application No. 14/145,740, filed on Dec. 31, 2013, now Pat. No. 8,725,170.

(51) Int. Cl.
*H04W 4/26* (2009.01)
*H04W 24/08* (2009.01)
*H04L 12/26* (2006.01)

(52) U.S. Cl.
CPC ............. *H04W 24/08* (2013.01); *H04L 43/04* (2013.01); *H04L 43/0876* (2013.01)

(58) Field of Classification Search
USPC .................. 370/252, 277, 278, 313, 338; 455/456.1, 456.2, 461; 709/203, 709/217–218, 223–229, 250
See application file for complete search history.

(56) References Cited

U.S. PATENT DOCUMENTS

| | | | |
|---|---|---|---|
| 8,606,294 B2 | 12/2013 | Alizadeh-Shabdiz | |
| 2004/0220956 A1* | 11/2004 | Dillon | 707/101 |
| 2007/0126635 A1 | 6/2007 | Houri | |
| 2011/0029359 A1 | 2/2011 | Roeding et al. | |
| 2012/0054106 A1* | 3/2012 | Stephenson et al. | 705/50 |
| 2012/0163206 A1* | 6/2012 | Leung et al. | 370/252 |
| 2013/0115969 A1 | 5/2013 | Holmes et al. | |
| 2013/0290543 A1* | 10/2013 | Lochhead et al. | 709/226 |
| 2014/0018095 A1* | 1/2014 | Parvizi et al. | 455/456.1 |
| 2014/0160948 A1* | 6/2014 | Rayburn et al. | 370/252 |

* cited by examiner

*Primary Examiner* — Awet Haile
(74) *Attorney, Agent, or Firm* — Clause Eight IPS; Michael Catania

(57) ABSTRACT

A system and method for measuring the quantity, type, transmission quality and visit history of mobile communication devices within a defined geographical area is disclosed herein. A data server is configured to receive new transmission data for mobile devices from each of a plurality of sensor devices and associate the new transmission data with a corresponding sensor device of the plurality of sensor devices. A console application is also configured to display the display information to an end-user operator.

15 Claims, 12 Drawing Sheets

SYSTEM AND METHOD FOR MEASURING THE QUANTITY, TYPE AND TRANSMISSION QUALITY OF MOBILE COMMUNICATION DEVICES WITHIN A DEFINED GEOGRAPHICAL AREA

CROSS REFERENCES TO RELATED APPLICATIONS

The Present application is a continuation-in-part application of U.S. patent application Ser. No. 14/145,740, filed on Dec. 31, 2014, which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention generally relates to WiFi transmission data and the collection of data associated with such transmissions in a specific venue.

2. Description of the Related Art

The prior art discusses various method of collecting data from WiFi transmissions, especially from mobile communication devices.

One reference is Holmes et al., U.S. Patent Publication Number 20130115969 for a System and Method for Cell Phone Targeting and Tracking, which discloses a system and method for tracking a plurality of user cell phones within a defined coverage area.

Another example is Roeding et al., U.S. Patent Publication Number 20110029359 for a Method and System for Detecting Presence Using a WI-FI Network Probe Detector, which discloses a detection system that monitors Wi-Fi wireless communications at a wireless device and detects a probe request associated with a location.

Yet another example is Houri, U.S. Patent Publication Number 20070126635 for a System and Method for Determining Geographic Location of Wireless Computing Devices, which discloses a system for enabling a wireless computing device to determine its position using a server with a database of identification and positional information about wireless beacons.

Yet another example is Alizadeh-Shabdiz, U.S. Pat. No. 8,606,294 for a Method of and System for Estimating Temporal Demographics of Mobile Users, which discloses a method of estimating demographic information associated with a selected geographical area including, for at least one individual, determining a selected geographical area along a portion of a track of travel of the individual and determining demographic information associated with the at least one individual.

General definitions for terms utilized in the pertinent art are set forth below.

APP is a software application for a mobile phone such as a smart phone.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

Beacon is a management frame that contains all of the information about a network. In a WLAN, Beacon frames are periodically transmitted to announce the presence of the network.

BLUETOOTH technology is a standard short range radio link that operates in the unlicensed 2.4 gigaHertz band.

Code Division Multiple Access ("CDMA") is a spread spectrum communication system used in second generation and third generation cellular networks, and is described in U.S. Pat. No. 4,901,307.

CRM (Customer Relationship Management) is a widely-implemented strategy for managing a company's interactions with customers, clients and sales prospects. CRM involves using technology to organize, automate, and synchronize business processes and the like—principally sales activities, but also business processes and the like for marketing, customer service and technical support.

DHCP (Dynamic Host Configuration Protocol) is a standard network protocol defined by RFC 1541 that allows a server to dynamically distribute IP addressing and configuration information, such as the subnet mask and the default gateway, to clients upon client requests.

Direct Inward Dialing ("DID") involves a carrier providing one or more trunk lines to a customer for connection to the customer's private branch exchange ("PBX") and a range of telephone lines are allocated to this line.

FTP or File Transfer Protocol is a protocol for moving files over the Internet from one computer to another.

GSM, Global System for Mobile Communications is a second generation digital cellular network.

Hypertext Transfer Protocol ("HTTP") is a set of conventions for controlling the transfer of information via the Internet from a web server computer to a client computer, and also from a client computer to a web server, and Hypertext Transfer Protocol Secure ("HTTPS") is a communications protocol for secure communication via a network from a web server computer to a client computer, and also from a client computer to a web server by at a minimum verifying the authenticity of a web site.

Internet is the worldwide, decentralized totality of server computers and data-transmission paths which can supply information to a connected and browser-equipped client computer, and can receive and forward information entered from the client computer.

Media Access Control (MAC) Address is a unique identifier assigned to the network interface by the manufacturer.

Organizationally Unique Identifier (OUI) is a 24-bit number that uniquely identifies a vendor, manufacturer, or organization on a worldwide basis. The OUI is used to help distinguish both physical devices and software, such as a network protocol, that belong to one entity from those that belong to another.

Probe Request: A frame that contains the advertisement IE for a device that is seeking to establish a connection with a proximate device.

Probe Response: A frame that contains the advertisement IE for a device. The Probe Response is sent in response to a Probe Request.

SSID (Service Set Identifier) is a 1 to 32 byte string that uniquely names a wireless local area network.

Transfer Control Protocol/Internet Protocol ("TCP/IP") is a protocol for moving files over the Internet.

URL or Uniform Resource Locator is an address on the World Wide Web.

User Interface or UI is the junction between a user and a computer program. An interface is a set of commands or menus through which a user communicates with a program. A command driven interface is one in which the user enter commands. A menu-driven interface is one in which the user selects command choices from various menus displayed on the screen.

Wayfinding is defined as tracking an object within a predetermined space.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

Wireless Application Protocol ("WAP") is an open, global specification that empowers users with mobile wireless communication devices (such as mobile phones) to easily access data and to interact with Websites over the Internet through such mobile wireless communication device. WAP works with most wireless communication networks such as CDPD, CDMA, GSM, PDC, PHS, TDMA, FLEX, reflex, iDEN, TETRA, DECT, DataTAC, Mobitex and GRPS.

WAP can be built on most operating systems including PalmOS, WINDOWS, CE, FLEXOS, OS/9, JavaOS and others.

WAP Push is defined as an encoded WAP content message delivered (pushed) to a mobile communication device which includes a link to a WAP address.

Wireless AP (access point) is a node on the wireless local area network (WLAN) that allows wireless devices to connect to a wired network using Wi-Fi, or related standards.

There is a need for measuring the quantity, type and quality of mobile communication devices within a defined geographical area.

BRIEF SUMMARY OF THE INVENTION

The present invention provides a method and system for measuring the quantity, type and transmission quality of mobile communication devices within a defined geographical area.

One aspect of the present invention a system for measuring the quantity, type, transmission quality and visit data of a plurality of mobile communication devices within a venue. The system includes a plurality of sensor devices and data server. Each of the plurality of sensor devices comprises a processor, a persistent storage, and one or more radiofrequency radio receivers operating in the 2-6 Ghz range. The data server comprises a processor, a database, at least one network connection, and at least one computer program configured to receive data uploads and store the data uploads in the database. Each of the plurality of sensor devices is configured to use one or more of the radiofrequency radio receivers to capture a plurality of WiFi protocol management transmissions from a plurality of mobile devices within range of the defined geographic area. Each of the plurality of sensor devices is configured to record to the persistent storage transmission data comprising each of the plurality of WiFi protocol management transmissions, and record for each of the WiFi protocol management transmissions a radio identifier for the mobile device, a transmission signal strength, and a transmission time. Each of the plurality of sensor devices periodically connects to the data server over a network and uploads the recorded WiFi protocol management transmissions to the data server. The data server is configured to receive the recorded transmission data from each of the plurality of sensor devices and associate the recorded transmission data with a corresponding sensor device of the plurality of sensor devices. The data server is configured to determine venue visit data of each of the plurality of mobile communication devices based on the recorded transmission data received from the plurality of sensor devices.

Preferably, the venue visit data comprises a visit history for each of the plurality of mobile communication devices. Alternatively, the venue visit data comprises a path through the venue for each visit by each of the plurality of mobile communication devices. Alternatively, the venue visit data comprises the areas of the venue visited by each of the plurality of mobile communication devices. Alternatively, the venue visit data comprises venue point data for each visit by each of the plurality of mobile communication devices.

Another aspect of the present invention is a method for measuring the quantity, type, transmission quality and visit data of a plurality of mobile communication devices within a defined geographical area. The method includes receiving at a plurality of sensor devices a plurality of WiFi protocol management transmissions from a plurality of mobile devices within range of the defined geographic area. The method also includes recording to a persistent storage of sensor device of the plurality of sensor devices a radio identifier for the mobile device, a transmission signal strength, and a transmission time for each of the WiFi protocol management transmissions. The method also includes connecting to a data server over a network and uploading the recorded WiFi protocol management transmissions to the data server. The method also includes receiving the recorded transmission data from each of the plurality of sensor devices at the data server and associating the recorded transmission data with a corresponding sensor device of the plurality of sensor devices. The method also includes determining at the data server the number of devices, the vendor of each device, a transmission quality, and venue visit data of the plurality of mobile communication devices based on the recorded transmission data received from the plurality of sensor devices.

Yet another aspect of the present invention is a system for measuring the quantity, type and transmission quality of a plurality of mobile communication devices within a defined geographical area. The system includes a plurality of sensor devices, each of the plurality of sensor devices comprising a processor, a memory, a persistent storage, one or more radiofrequency radio receivers operating in the 2-6 GHz range, an operating system, and at least one computer program. The system also includes a data server comprising a processor, a memory, a SQL database, at least one network connection, at least one computer program configured to receive data uploads and store the data uploads in the SQL database, and an API. The system further includes a console application comprising a user interface and a charting function designed to create filtered charting data.

Each of the plurality of sensor devices preferably is configured to use one or more of the radiofrequency radios to capture a plurality of Wi-Fi protocol management transmissions from a plurality of mobile devices within range of a defined geographic area. Each of the plurality of sensor devices preferably is configured to record to the persistent storage transmission data comprising each of the plurality of Wi-Fi protocol management transmissions, and for each transmission a radio identifier for the mobile device, a transmission signal strength, and a transmission time. Each of the plurality of sensor devices periodically connects to the data server over a network and uploads new transmission data.

The system includes that the data server is configured to receive new transmission data from each of the plurality of sensor devices and associate the new transmission data with a corresponding sensor device of the plurality of sensor devices. The API of the data server is configured to grant access to one or more analysis and visualization tools running in the console application.

The system further includes that the console application is configured to organize the transmission data into display information based upon at least one of date, mobile device type, and sensor device. The console application is also configured to display the display information to an end-user operator.

Preferably, each of the plurality of sensor devices periodically connects to the data server over a Wi-Fi network or a cellular network.

Preferably, the user interface of the console application comprises a plurality of functions for selecting one or more of the plurality of sensor devices.

Preferably, the defined geographical area is a venue, and the venue comprises a WLAN comprising a plurality of wireless access points and a DHCP server in communication with the WLAN, the DHCP server configured to associate an IP address with a MAC address of a mobile device.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
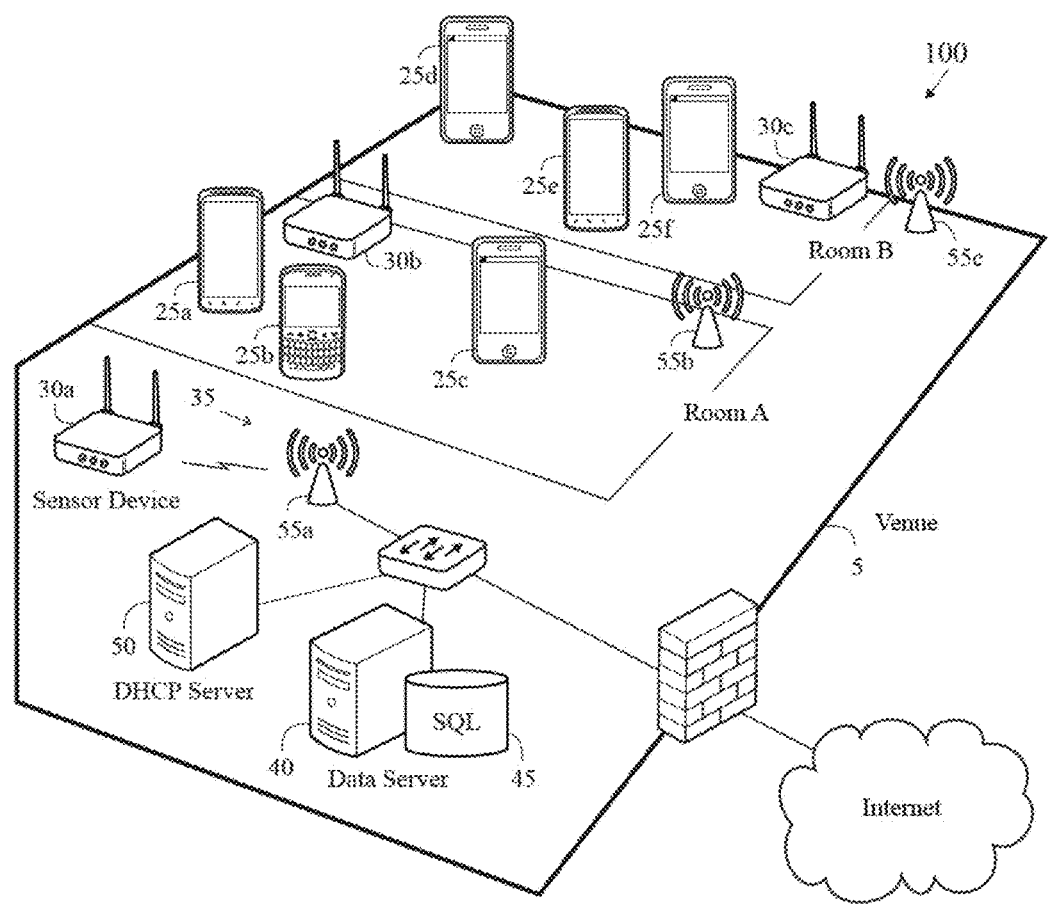
FIG. 1 is an illustration of a system for measuring the quantity, type and transmission quality of mobile communication devices within a defined geographical area.

The system 100 for measuring the quantity, type and transmission quality of mobile communication devices within a defined geographical area is shown in FIG. 1. There are several mobile communication devices 25a-25f within a defined geographical area. Also shown in the system 100, are sensor devices 30a-30c, a data server 40 including a SQL database 45, and a network, a wireless LAN 35.

The defined geographical area is preferably a venue 5, and the venue 5 comprises a WLAN 35 including wireless access points 55a-55c and a DHCP server 50 in communication with the WLAN 35. The DHCP server 50 is configured to associate an IP address with a MAC address of a mobile device 25.

In infrastructure WLANs, wireless stations (devices with radio network cards) connect to wireless access points that function as bridges between the stations and the existing network backbone.

Figure 2:
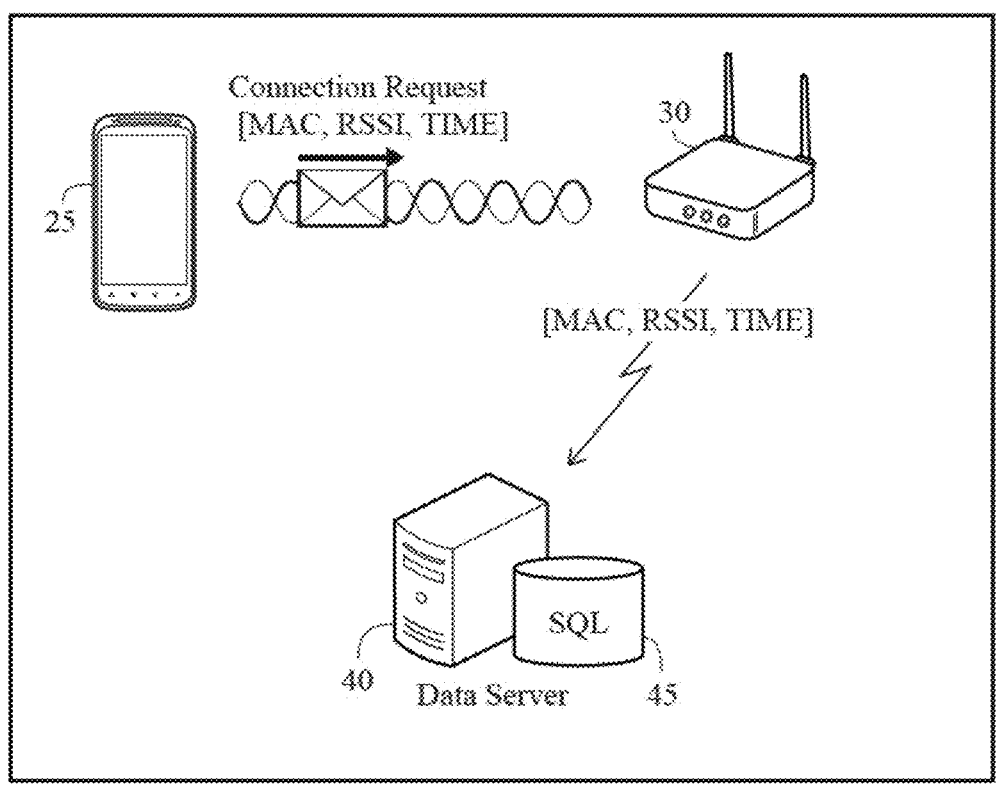
FIG. 2 is a block diagram of communication between components within a system for measuring the quantity, type and transmission quality of mobile communication devices within a defined geographical area.

Mobile devices 25a-25f with Wi-Fi enabled periodically transmit probe requests to locate an access point, even when not associated to a network. A probe request includes the device's radio identifier (MAC address), transmission signal strength (RSSI), and transmission time, as shown in FIG. 2. A probe request may or may not contain the SSID of a wireless AP. From the probe request transmissions of all the mobile devices within a specified area, the number of devices, the vendor of each device, and the transmission quality of each device can be determined.

The mobile communication devices 25 utilized with the present invention preferably include mobile phones, smartphones, tablet computers, PDAs and the like. Examples of smartphones and the device vendors include the IPHONE® smartphone from Apple, Inc., the DROID® smartphone from Motorola Mobility Inc., GALAXY S® smartphones from Samsung Electronics Co., Ltd., and many more. Examples of tablet computing devices include the IPAD® tablet from Apple Inc., and the XOOM™ tablet from Motorola Mobility Inc.

A mobile communication service provider (aka phone carrier) of the customer such as VERIZON, AT&T, SPRINT, T-MOBILE, and the like mobile communication service providers, provide the communication network for communication to the mobile communication device of the end user.

Wireless standards include 802.11a, 802.11b, 802.11g, AX.25, 3G, CDPD, CDMA, GSM, GPRS, radio, microwave, laser, Bluetooth, 802.15, 802.16, and IrDA.

A sensor device 30 is configured to use one or more of the radiofrequency radios to capture the WI-FI protocol management transmissions from the mobile devices within range of a defined geographic area, such as within Room A or Room B within a venue 5, as shown in FIG. 1, or within the entire venue 5. Placement and position of the sensors will be determined by the sensor's maximum range and the network configuration, the facility/building, and the application requirements.

The sensor devices 30a-30c are configured to record the transmissions captured. The sensor devices 30a-30c periodically connects to the data server 40 over a network 35 and uploads new transmission data to the data server 40. The data server is configured to receive new transmission data from each of the sensor devices 30a-30c and associate the new transmission data with a corresponding sensor device.

The sensor devices connect to the data server over a Wi-Fi network or a cellular network.

Figure 3:
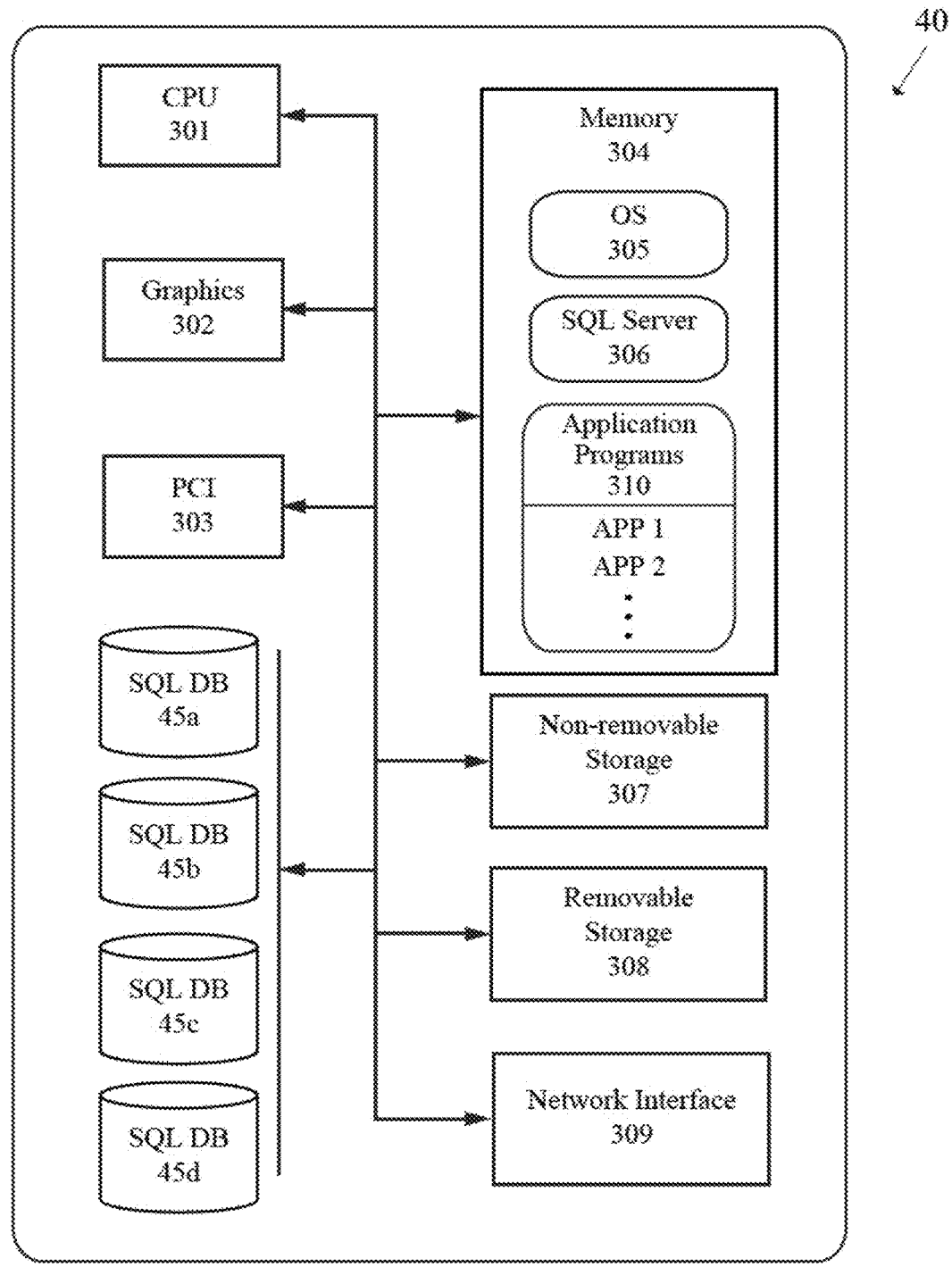
FIG. 3 is a block diagram of components of a preferred embodiment of a data server.

FIG. 3 shows components of a general data server 40 of a system for measuring the quantity, type and transmission quality of mobile communication devices within a defined geographical area. The data server 40 includes a CPU component 301, a graphics component 302, PCI/PCI Express 303, RAM memory 304, non-removable storage 307, removable storage 308, Network Interface 309, including one or more connections to a fixed network 35, and a SQL database 45a-45d. Included in the memory 304, is the operating system 305, the SQL server 306, and computer programs 310. The data server 40 also includes at least one computer program configured to receive data uploads and store the data uploads in the SQL database. The SQL server 306 comprises of other components of SQL server that can be installed separately from the SQL database engine.

Each of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. The databases used with the system preferably include but are not limited to MSSQL, Access, MySQL, Progress, Oracle, DB2, Open Source DBs and others. Operating system used with the system preferably include Microsoft 2010, XP, Vista, 200o Server, 2003 Server, 2008 Server, Windows Mobile, Linux, Android, Unix, I series, AS 400 and Apple OS.

The underlying protocol at a server, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP"), Secure Hypertext Transfer Protocol ("HTTPS") or other similar protocols. The transmission protocol ranges from SIP to MGCP to FTP and beyond. The protocol at the server is preferably HTTPS.

Figure 4:
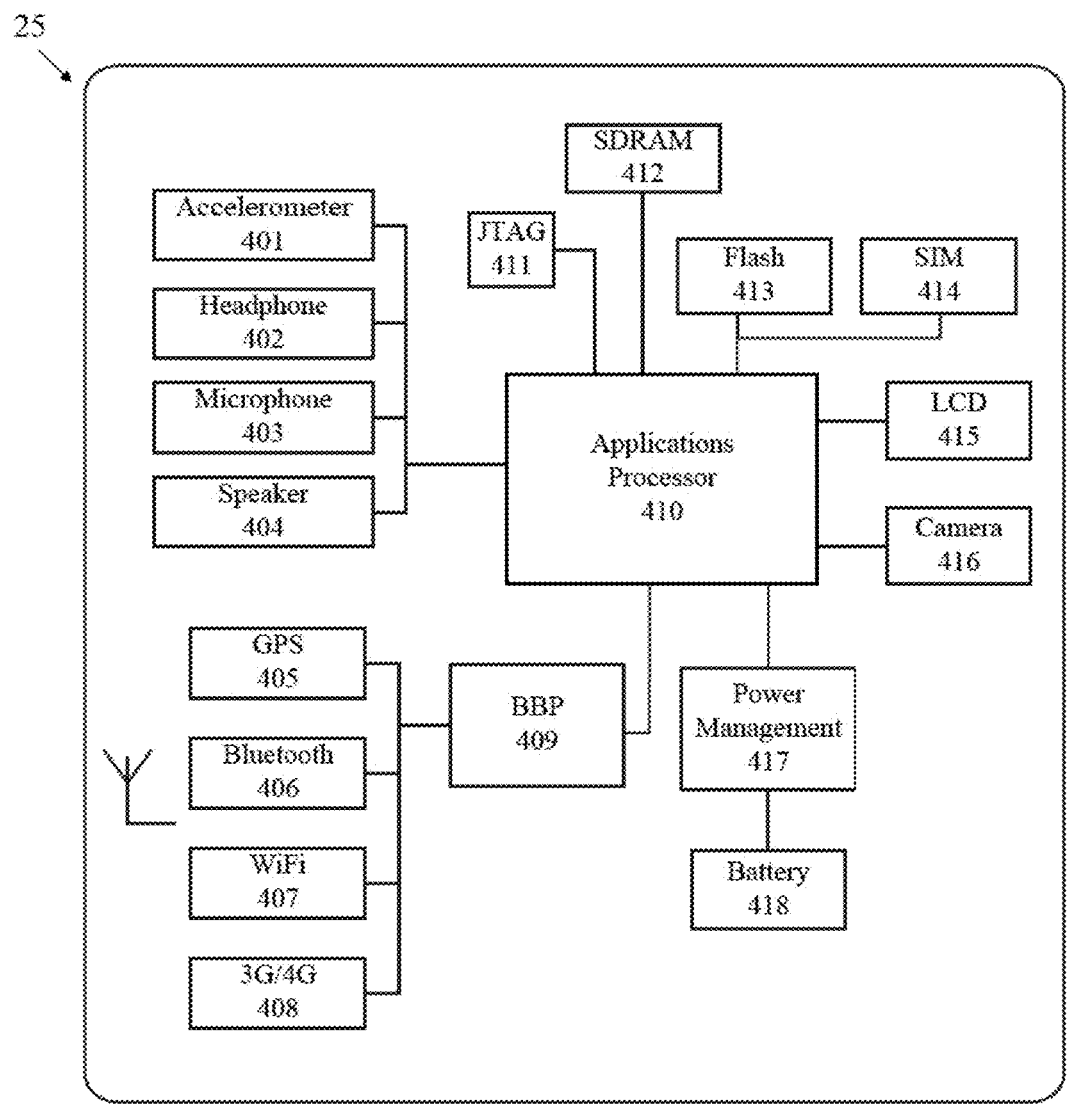
FIG. 4 is a block diagram of components of a preferred embodiment of a mobile communication device.

As shown in FIG. 4, a typical mobile communication device 25 includes an accelerometer 401, a headphone jack 402, a microphone jack 403, a speaker 404, a GPS chipset 405, a Bluetooth component 406, a Wi-Fi component 407, a 3G/4G component 408, a Baseband Processor (for radio control) 409, an applications processor 410, a JTAG (debugger) 411, a SDRAM memory 412, a Flash memory 413, SIM card 414, LCD display 415, a camera 416, a power management circuit 417 and a battery or power source 418.

Figure 5:
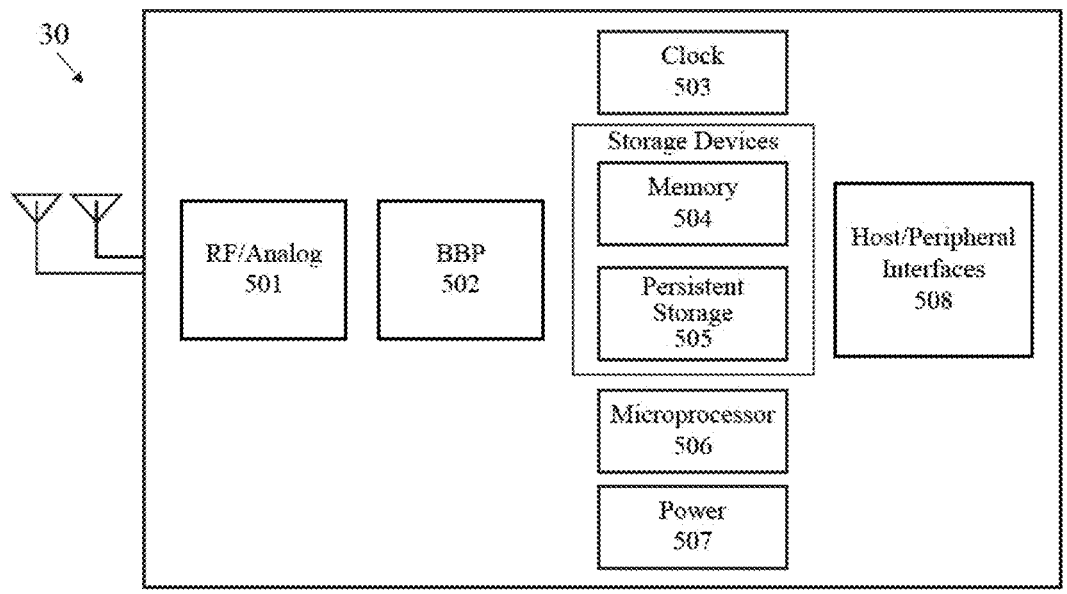
FIG. 5 is a block diagram of components of a preferred embodiment of sensor device.
Figure 6:
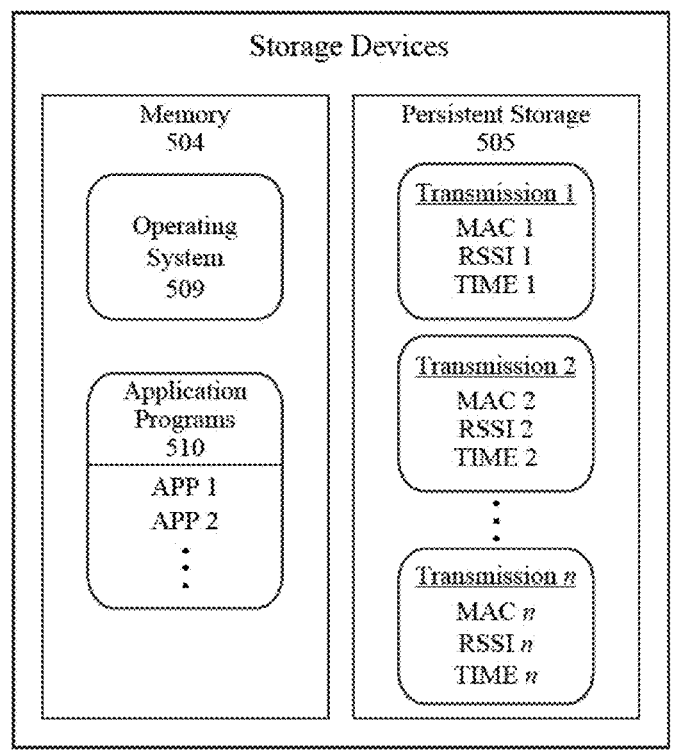
FIG. 6 is a block diagram of the storage devices of a preferred embodiment of a sensor device.

FIG. 5 shows components of a general sensor device 30. The sensor device 30 includes RF/analog component 501 (one or more RF radio receivers), a Baseband Processor 502, clock 503, storage devices, including RAM memory 504 and persistent storage 505, CPU 506, power 507, and I/O 508. FIG. 6 further shows the storage devices; RAM memory 504 and persistent storage 505. The operating system 509 and the computer programs 510 reside in the memory 504. The transmissions recorded by the sensor device 30 are stored in the persistent storage 505.

Figure 7:
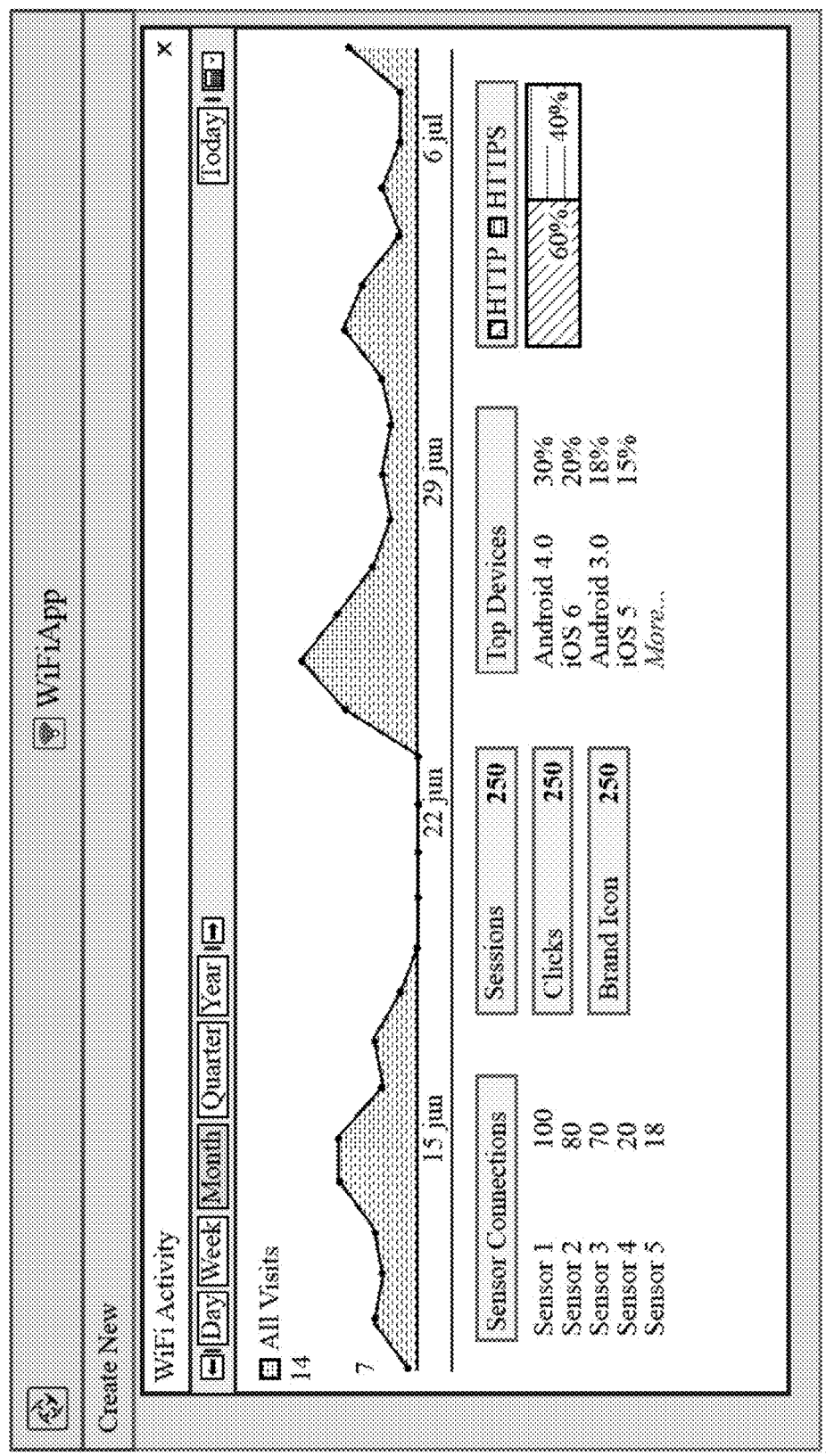
FIG. 7 is an illustration of features of a console application of the system for measuring the quantity, type and transmission quality of mobile communication devices within a defined geographical area.
Figure 8:
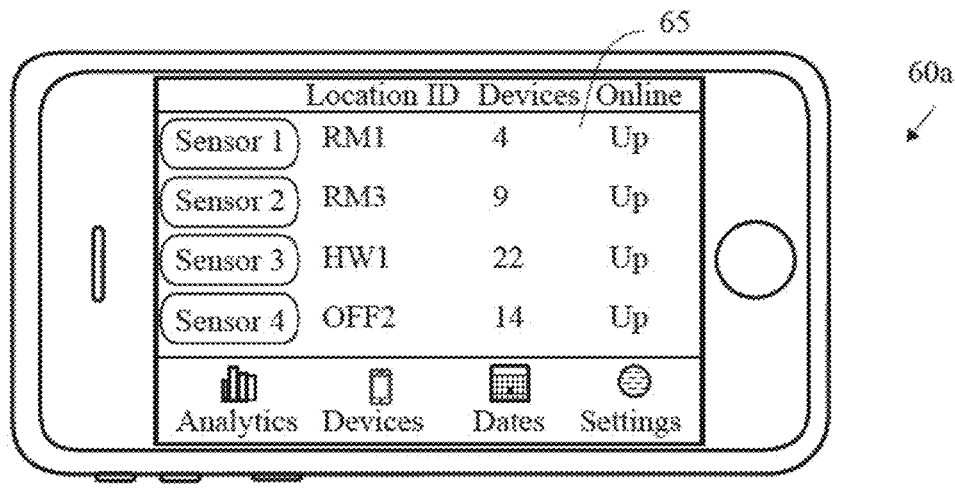
FIG. 8 is an illustration of a console application of the system for measuring the quantity, type and transmission quality of mobile communication devices within a defined geographical area.
Figure 8A:
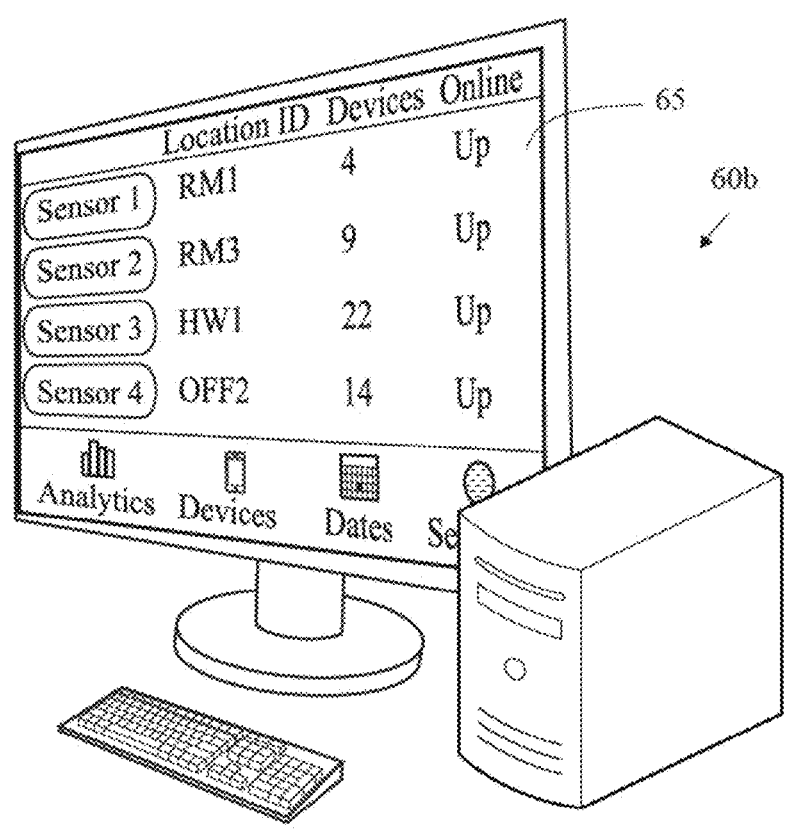
FIG. 8A is an illustration of a console application of the system for measuring the quantity, type and transmission quality of mobile communication devices within a defined geographical area.

The system for measuring the quantity, type and transmission quality of mobile communication devices within a defined geographical area also includes a console application 65 comprising a user interface and a charting function designed to create filtered charting data, as shown in FIGS. 7-8A. The console application is configured to organize the transmission data and to display the display information to an end-user operator. The console application 65, used by the end-user operator, is preferably on a smartphone 60a, as shown in FIG. 8, or a desktop 60b, as shown in FIG. 8A. However, the console application is not limited to the output devices shown in FIGS. 8-8A. The user interface of the console includes functions for selecting one or more sensor devices. The transmission data can be displayed or sorted based upon the date, the mobile device type, or sensor device, or any other such information. The data server 40 of the system includes an API, which is configured to grant access to one or more analysis and visualization tools running in the console, as shown in FIG. 7.

Figure 9:
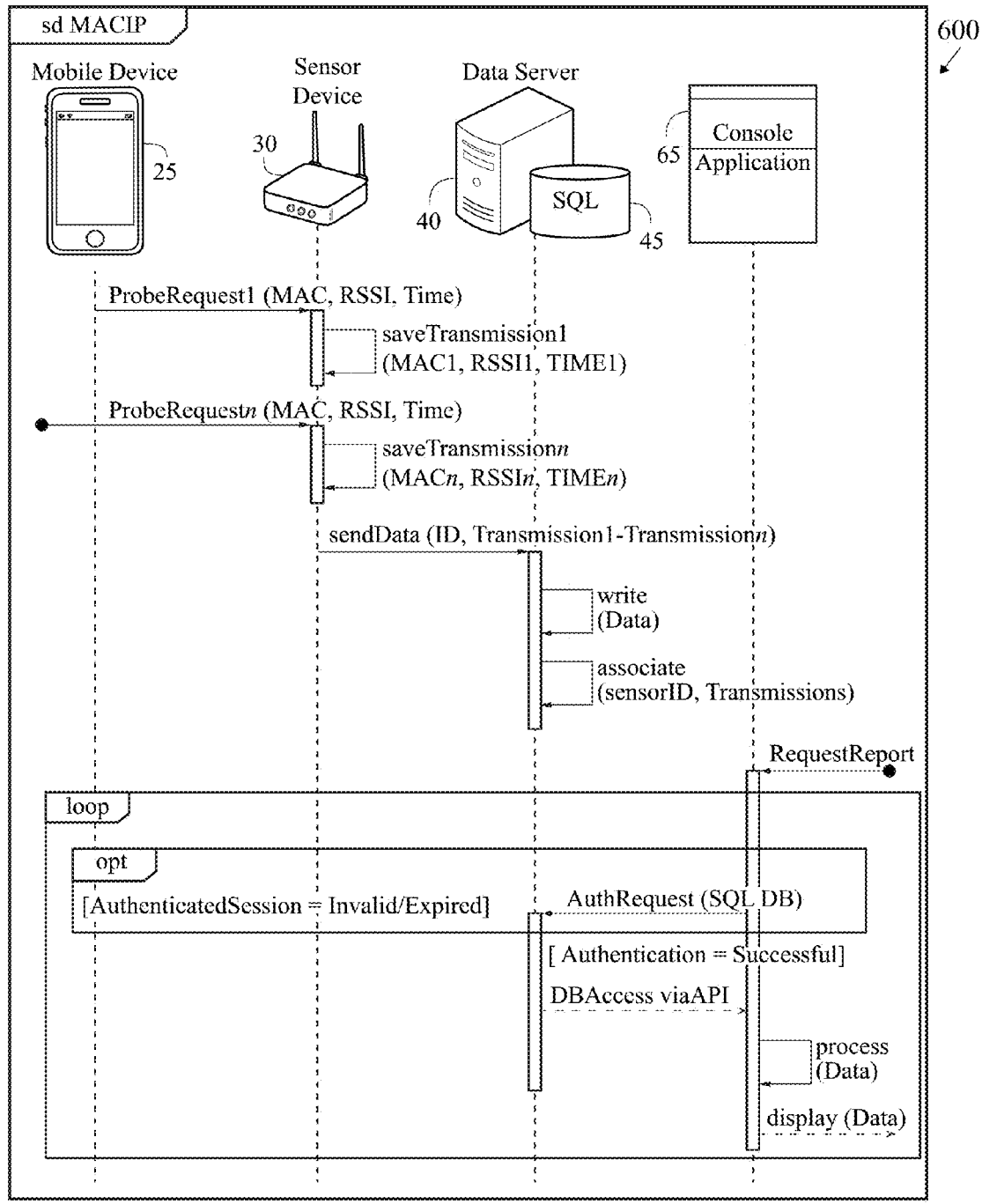
FIG. 9 is a sequence diagram of a system for measuring the quantity, type and transmission quality of mobile communication devices within a defined geographical area.

A sequence diagram, sdMACIP, 600 is shown in FIG. 9. For an example shown, only one sensor device 30 and one mobile device 25 are illustrated, however, there may be more than one sensor and/or more than one mobile device in a system of the present invention. The sensor 30 uses its radiofrequency radio(s) to listen on the wireless network for devices 25 scanning for wireless APs. As a mobile device 25 sends a probe request, the sensor device 30 captures the transmission and saves the information to memory. Any number of transmissions sent from other devices (shown as an outside source), such as ProbeRequestn, can be captured and stored by the sensor device 30. The typical data captured includes the device 25 MAC address, the quality of the relative received signal strength in the wireless LAN, and the time of input. The sensor device 30 is configured to forward all the new transmission data captured to a connected data server 40 over a network. The data server 40 is configured to receive new transmission data from each sensor device and associate the new transmission data with the corresponding sensor device ID. The data server 40 writes the transmission information and the corresponding sensor ID into the database 45.

The console application 65 runs one or more analysis and visualization tools which is accessed by a user interface. With the charting function, a user can choose to design filtered charts and display the results. When a user (shown as an outside source) requests a report on the console application 65, the console application 65 first authenticates the application 65 to the SQL Database 45. There are various ways to authenticate, such as user authentication instead of application authentication. After successfully authenticating, the API grants the console application 65 access to the database 45 contents. The analysis and visualization tools of the console application 65 can then process the data, such as sorting data by date, by manufacturer, or by sensor, creating a chart, or analyzing specific data. After processing the data, the console application 65 then displays the results, such as graphs, charts, or reports, to the user (shown as an outside source).

The radio receivers of each of the sensor devices 30 preferably operate in the 2-6 giga-Hertz range. BLUETOOTH™ technology operates in the unlicensed 2.4 GHz band of the radio-frequency spectrum, and in a preferred embodiment each sensor device 30 is capable of receiving and transmitting signals using BLUETOOTH™ technology. LTE Frequency Bands include 698-798 MHz (Band 12, 13, 14, 17); 791-960 MHz (Band 5, 6, 8, 18,19,20); 1710-2170 MHz (Band 1, 2, 3, 4, 9, 10, 23, 25, 33, 34, 35, 36, 37, 39); 1427-1660.5 MH (Band 11, 21, 24); 2300-2700 MHz (Band 7, 38, 40, 41); 3400-3800 MHz (Band 22, 42, 43), and in a preferred embodiment each sensor device 30 is capable of receiving and transmitting signals using one or more of the LTE frequency bands. WiFi preferably operates using 802.11a, 802.11b, 802.11g, 802.11n communication formats as set for the by the IEEE, and in a preferred embodiment each sensor device 30 is capable of receiving and transmitting signals using one or more of the 802.11 communication formats. The radio receivers are used by the sensor devices 30 to intercept probe requests from mobile communication devices 25 such as mobile phones or tablets that are present at a venue. The data obtained from the signals of the mobile communication devices 25 are preferably stored in the memory 504 or persistent storage 505 of each sensor device 30. A computer program that runs on the sensor device is configured to store and then transfer the data.

The data is preferably transferred to the data server 40 using either a cellular network (such as a mobile phone network, e.g., the VERIZON® network) or over the Internet using the WLAN of the venue. The data server 40 comprises at least one computer program to receive the data uploads and store the data uploads in a SQL database. An API of the data server 40 grants access to one or more analysis and visualization tools running in a console application 65 that is on a computing device of an end user, typically the end user is associated with the venue. The venue is preferably a casino resort, a mall or a grocery store. Alternatively, the venue is an airport, a train station, a city center, an amusement park, or a business campus. A venue includes a venue comprising multiple wireless APs.

The system preferably allows an operator to determine if a particular geographic location of a venue provides an adequate WiFi connection to a mobile communication device 25. Further, the system provides an end user running the console application 65 with quality information to determine if a geographic location is constantly below a threshold WiFi connection standard, or only temporarily below a threshold WiFi connection standard as established by the venue. Network throughput measures the amount of data successfully transmitted, between two locations in a data network, usually not including header, footer or routing information bits. It is generally measured in bits per second (bps). Maximum theoretical WiFI throughput usually occurs between 150 Mbps to 450 Mbps. Data communication network analysis can include, but is not limited to, certain measurements: throughput, bandwidth, quality of service, dropped packet rate, packet latency, round trip time, propagation delay, transmission delay, processing delay, queuing delay, network capacity, packet jitter, bit error rate, packet error rate, and frame error rate.

Figures 10A, 10B:
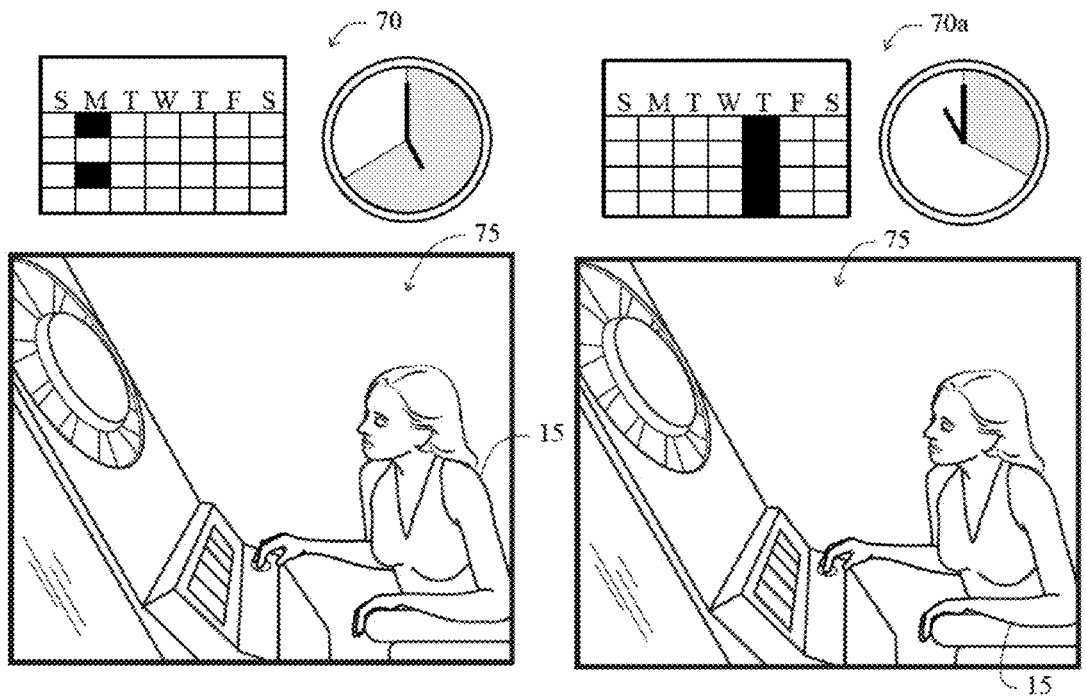
FIG. 10A is an illustration of a screen of a console application of a patron at a gaming machine of a venue during a Monday along with the amount of time the patron stayed at the gaming machine.
FIG. 10B is an illustration of a screen of a console application of a patron at a gaming machine of a venue during a Thursday along with the amount of time the patron stayed at the gaming machine.
Figure 10C:
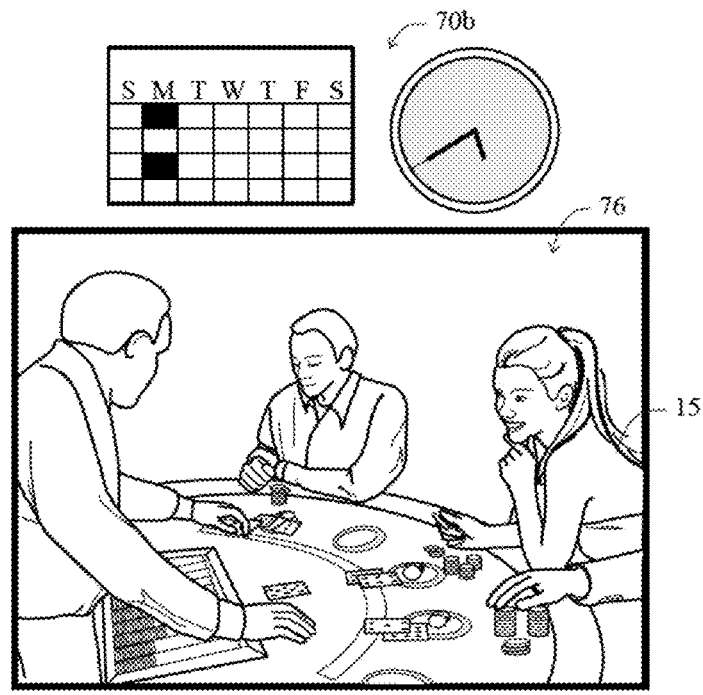
FIG. 10C is an illustration of a screen of a console application of a patron at a gaming machine of a venue during a subsequent Monday along with the amount of time the patron stayed at the gaming machine.

As shown in FIGS. 10A, 10B and 10C, a system for measuring the quantity, type, transmission quality and visit data of a plurality of mobile communication devices within a venue can determine a visit history for patron including the amount of time spent during the visit and where on the venue property the patron spent that time. The console application provides the visit data to a venue operator to better allocate resources and determine the preferences of patrons. The console application illustrates a schedule 70 for a patron during visits to a venue by the patron. The patron 15 plays slots 75 on a first Monday and a Thursday, but then plays blackjack 76 on a subsequent Monday.

As discussed above, the system 100 identifies a MAC address on the mobile communication device 25 of the patron 15 of the venue 5. If the patron 15 is a member of the rewards club program of the venue, then as discussed above, the system 100 matches the mobile communication device 25 with the patron 15 and stores the patron's movement in a CRM database 45 of the venue 5. Thus, the amount of time spent at a slot machine 75 or a blackjack table 76 is stored in an account for the patron 15 in the CRM database 45 of the venue, even without the patron 15 swiping a rewards club card at the slot machine 75 or blackjack table 76. The system 100 determines from the probe requests of the mobile communication device 25 of the patron 15 that the patron 15 is at a particularly area of the venue 5, and based on those probe requests, the system 100 determines how much time the patron 15 has spent at that area. This information is collected and stored in the CRM database 45 of the venue 5.

Figure 11A:
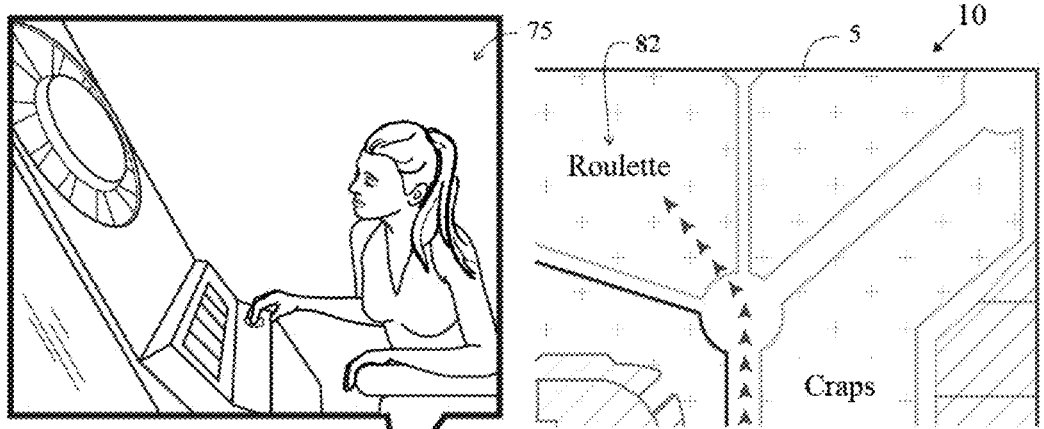
FIG. 11A illustrates an area (a slot machine) on a venue property where a patron visits.
Figure 11B:
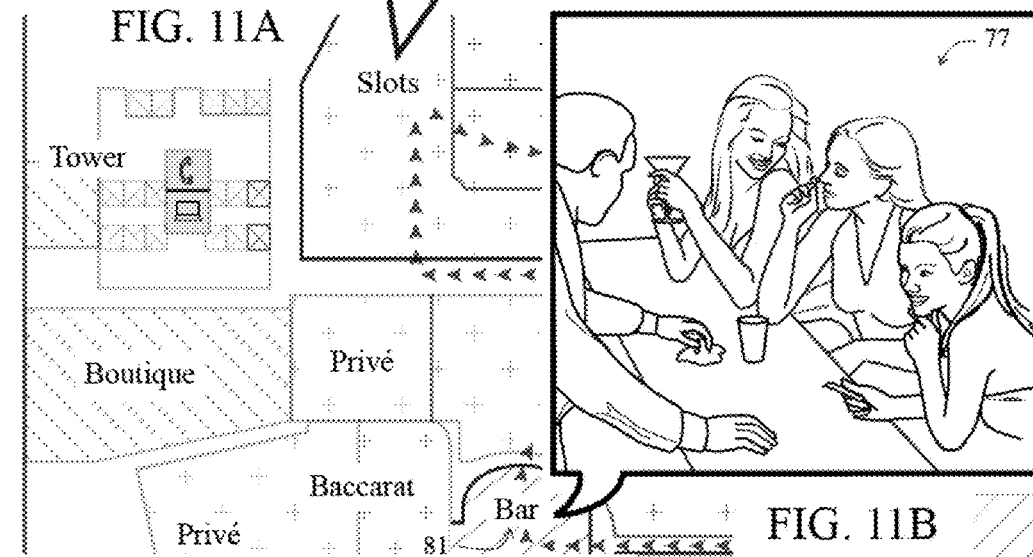
FIG. 11B illustrates an area (a bar) on a venue property where a patron visits.
Figure 11C:
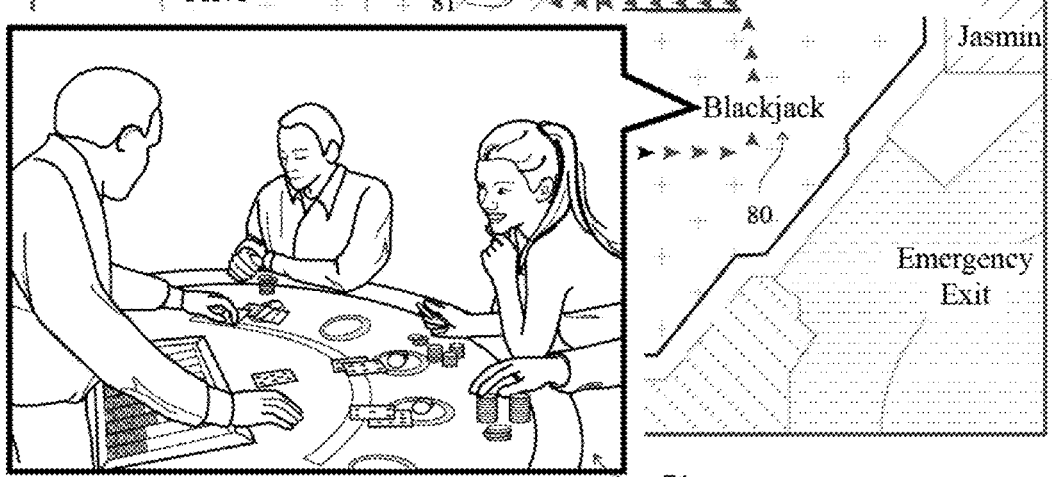
FIG. 11C illustrates an area (a blackjack table) on a venue property where a patron visits.

As shown in FIGS. 11A, 11B and 11C, a system for measuring the quantity, type, transmission quality and visit data of a plurality of mobile communication devices within a venue can determine where on the venue property the patron spends time. The console application provides the visit data to a venue operator to better allocate resources and determine the preferences of patrons. A map 10 of the venue is shown on a console application. A patron 15 plays slots 75, as shown in FIG. 11A, then has a drink at a bar 77, as shown in FIG. 11B, and plays blackjack 80 as shown in FIG. 11C.

As discussed above, the system 100 identifies a MAC address on the mobile communication device 25 of the patron 15 of the venue 5. If the patron 15 is a member of the rewards club program of the venue, then as discussed above, the system 100 matches the mobile communication device 25 with the patron 15 and stores the patron's movement in a CRM database 45 of the venue 5. Thus, the amount of time spent at a slot machine 75, bar 77 or a blackjack table 76 is stored in an account for the patron 15 in the CRM database 45 of the venue, even without the patron 15 swiping a rewards club card at the slot machine 75 or blackjack table 76. The system 100 determines from the probe requests of the mobile communication device 25 of the patron 15 that the patron 15 is at a particularly area of the venue 5, and based on those probe requests, the system 100 determines how much time the patron 15 has spent at that area. This information is collected and stored in the CRM database 45 of the venue 5.

Figure 12:
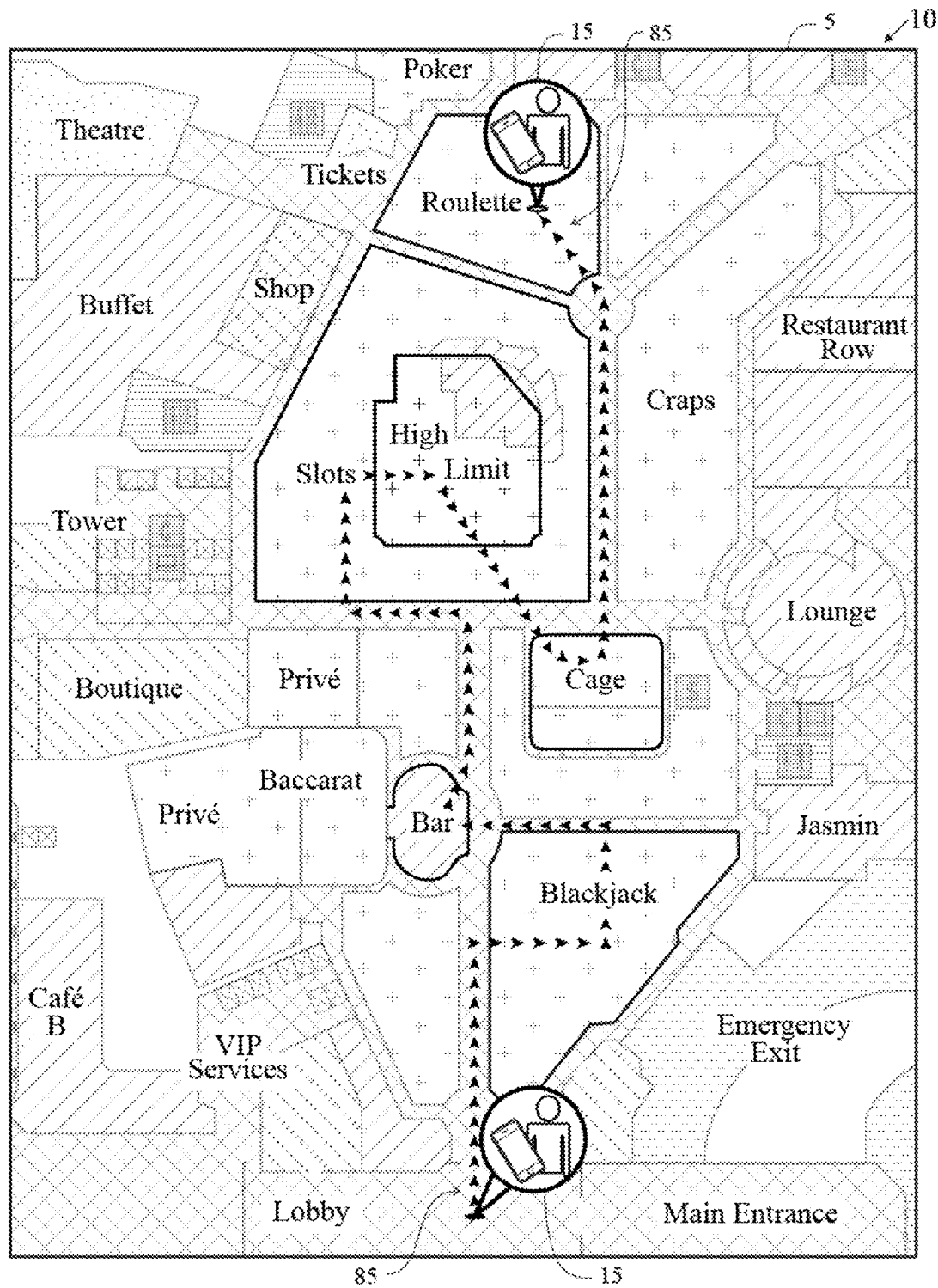
FIG. 12 is a map of a venue illustrating a path taken by a patron of the venue during a visit.

As shown in FIG. 12, a system for measuring the quantity, type, transmission quality and visit data of a plurality of mobile communication devices within a venue can determine a path that a particular patron traveled during a visit to the venue property. A map 10 of a venue 5 illustrates a path 85 of a patron 15 through the venue 5. As discussed above, the system 100 identifies a MAC address on the mobile communication device 25 of the patron 15 of the venue 5. If the patron 15 is a member of the rewards club program of the venue, then as discussed above, the system 100 matches the mobile communication device 25 with the patron 15 and stores the patron's movement in a CRM database 45 of the venue 5. The system 100 determines from the probe requests of the mobile communication device 25 of the patron 15 the path of the patron through the venue 5. Further, the system 100 may use sensors on the mobile communication device 25 such as disclosed in Boyle, U.S. patent application Ser. No. 14/016, 185, filed on Sep. 2, 2013, for a Method And System For Wayfinding, which is hereby incorporated by reference in its entirety. This information is collected and stored in the CRM database 45 of the venue 5

Figures 13A, 13B:
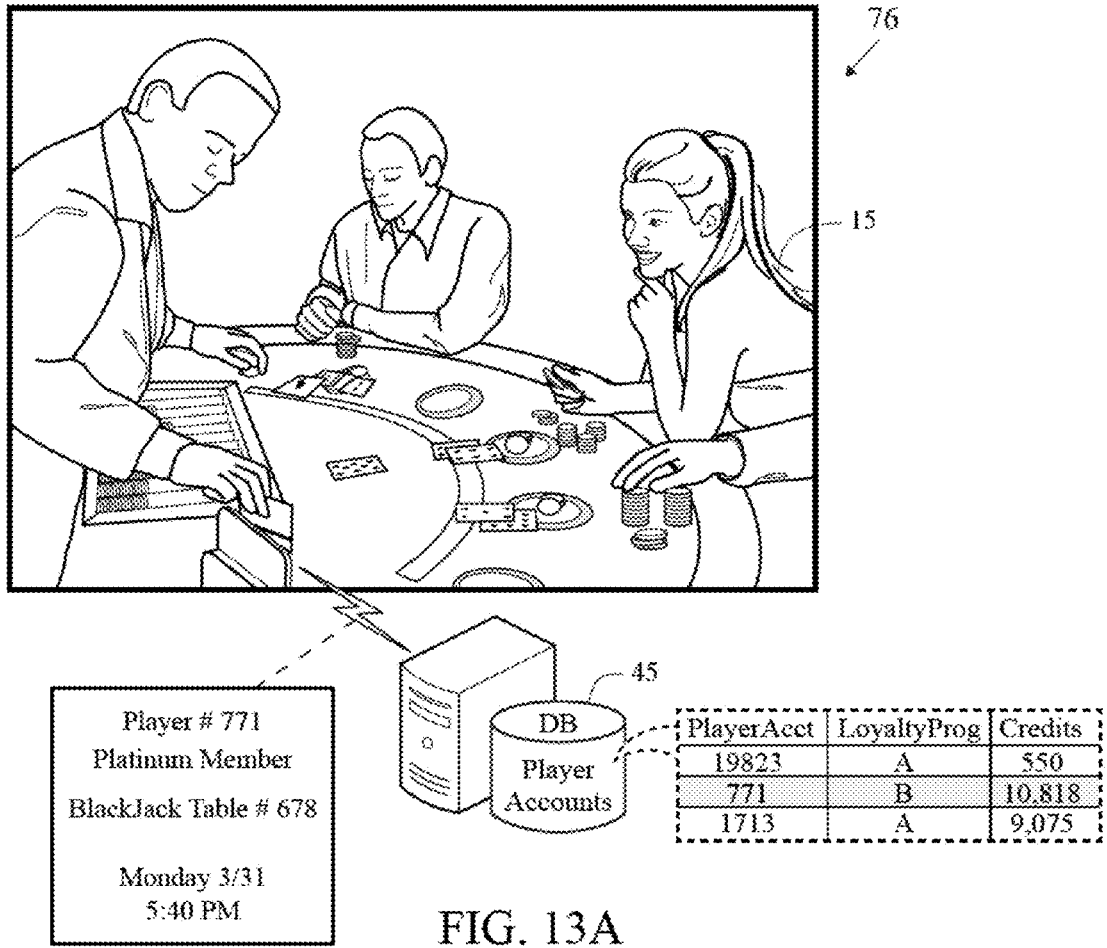
FIG. 13A is a block diagram illustrating a system for measuring the quantity, type, transmission quality and visit data (in the form of venue club point data) of mobile communication devices within a defined geographical area.
FIG. 13B is a table of a venue point data for a patron of a venue.

As shown in FIGS. 13A and 13B, a system for measuring the quantity, type, transmission quality and visit data of a plurality of mobile communication devices within a venue can determine a patron's visit from venue point data accumulated in a rewards club program of the venue. As the patron 15 plays blackjack, venue points are accumulated by the patron and recorded in the CRM database 45 of the venue. A table 90 shows the point activity for the patron 15.

As discussed above, the system 100 identifies a MAC address on the mobile communication device 25 of the patron 15 of the venue 5. If the patron 15 is a member of the rewards club program of the venue, then as discussed above, the system 100 matches the mobile communication device 25 with the patron 15 and stores the patron's movement in a CRM database 45 of the venue 5. Thus, the amount of time spent at a blackjack table 76 is stored in an account for the patron 15 in the CRM database 45 of the venue, even without the patron 15 swiping a rewards club card at the slot machine 75 or blackjack table 76. The system 100 determines from the probe requests of the mobile communication device 25 of the patron 15 that the patron 15 is at a particularly area of the venue 5, and based on those probe requests, the system 100 determines how much time the patron 15 has spent at that area. Further, the point data for the patron 15 is collected and stored in the CRM database 45 of the venue 5.

Thus, the visit history of the patron 15 to the venue 5 is available on the console application to provide the operator of the venue 5 with additional information of patrons of the venue.

The present invention may be utilized with a marketing system such as disclosed in Boyle et al., U.S. patent application Ser. No. 13/671,538, filed on Nov. 7, 2012, for a Method And System For Personalized Venue Marketing, which is hereby incorporated by reference its entirety. The present invention may be utilized with a gaming system such as disclosed in Boyle, U.S. patent application Ser. No. 13/769, 376, filed on Feb. 13, 2013, for a System And Method For Managing Games In A Mobile Virtual Casino, which is hereby incorporated by reference its entirety. The present invention may be utilized with a gaming system such as disclosed in Boyle, U.S. patent application Ser. No. 13/756, 591, filed on Jan. 31, 2013, for a System And Method For Virtual Currency In A Virtual Casino, which is hereby incorporated by reference its entirety. The present invention may be utilized with a gaming system such as disclosed in Boyle, U.S. patent application Ser. No. 13/789,686, filed on Mar. 8, 2013, for a System And Method For Secure Play In A Mobile Virtual Casino, which is hereby incorporated by reference its entirety. The method and system of the present invention may be utilized with an anonymous loyalty program such as described in Boyle, U.S. Pat. No. 8,463,645, for an Anonymous Rewards Club Program, which is hereby incorporated by reference in its entirety. The method and system of the present invention may be utilized with the system described in Boyle et al., U.S. Pat. No. 8,693,403, for a Method And System For Detection And Correction of Wi-Fi Login Failure, which is hereby incorporated by reference in its entirety. The method and system of the present invention may be utilized with the system described in Greer et al., U.S. patent application Ser. No. 13/775,226, filed on Feb. 24, 2013, for an Segmented Architecture Method And System, which is hereby incorporated by reference in its entirety. The method and system of the present invention may be utilized with the system described in Boyle, U.S. patent application Ser. No. 13/844,585 filed on Mar. 15, 2013, for a Method And System For Freemium WiFi Service, which is hereby incorporated by reference in its entirety. The method and system of the present invention may be utilized with the system described in Boyle, U.S. patent application Ser. No. 13/843,627 filed on Mar. 15, 2013, for a Method And System For Incentivizing On-Site Participation In Games And Offers which is hereby incorporated by reference in its entirety. The method and system of the present invention may be utilized with the system described in Boyle, U.S. patent application Ser. No. 13/974, 040 filed on Aug. 22, 2013, for a Method And System For Including Content In A WiFi Stream, which is hereby incorporated by reference in its entirety. The method and system of the present invention may be utilized with the system described in Boyle, U.S. Pat. No. 8,583,777, for a Method And System For Providing Real-Time End-User WiFi Quality Data, which is hereby incorporated by reference in its entirety. The method and system of the present invention may be utilized with the system described in Boyle, U.S. patent application Ser. No. 14/016,185, filed on Sep. 2, 2013, for a Method And System For Wayfinding, which is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention:

1. A system for measuring the quantity, type, transmission quality and visit data of a plurality of mobile communication devices within a venue, the system comprising:
   a plurality of sensor devices, each of the plurality of sensor devices comprising a processor, a persistent storage, and one or more radiofrequency radio receivers operating in the 2-6 Ghz range;
   a data server comprising a processor, a database, at least one network connection, an application programming interface (API), and at least one computer program configured to receive data uploads and store the data uploads in the database;
   a customer relations management (CRM) database; and
   a console application comprising a user interface and a charting function designed to create filtered charting data;
   wherein each of the plurality of sensor devices is configured to use one or more of the radiofrequency radio receivers to capture a plurality of WiFi protocol management transmissions from a plurality of mobile devices within range of a defined geographic area of the venue, wherein each of the plurality of sensor devices is configured to record to the persistent storage transmission data comprising each of the plurality of WiFi protocol management transmissions, and record for each of the WiFi protocol management transmissions a radio identifier for the mobile device, a transmission signal strength, and a transmission time;

wherein each of the plurality of sensor devices periodically connects to the data server over a network and uploads the recorded WiFi protocol management transmissions to the data server;

wherein the data server is configured to receive the recorded transmission data from each of the plurality of sensor devices and associate the recorded transmission data with a corresponding sensor device of the plurality of sensor devices;

wherein the data server is configured to determine venue visit data of each of the plurality of mobile communication devices based on the recorded transmission data received from the plurality of sensor devices;

wherein the system determines if a mobile communication device of the plurality of mobile communication devices is associated with a member of a rewards program of the venue;

wherein the system determines the amount of time spent by a mobile communication device of the plurality of mobile communication devices at a location in the venue and stores the data in the CRM database;

wherein the API of the data server is configured to grant access to one or more analysis and visualization tools running in the console application;

wherein the console application is configured to display the venue visit data and quality information for a WiFi connection to an end-user operator.

2. The system according to claim 1 wherein each of the plurality of sensor devices periodically connects to the data server over a WiFi network or a cellular network.

3. The system according to claim 1 wherein the venue visit data comprises a visit history for each of the plurality of mobile communication devices.

4. The system according to claim 1 wherein the venue visit data comprises a path through the venue for each visit by each of the plurality of mobile communication devices.

5. The system according to claim 1 wherein the venue visit data comprises the areas of the venue visited by each of the plurality of mobile communication devices.

6. The system according to claim 1 wherein the venue visit data comprises venue point data for each visit by each of the plurality of mobile communication devices.

7. The system according to claim 1 wherein the venue visit data comprises a venue point data for each visit by each of the plurality of mobile communication devices, the areas of the venue visited by each of the plurality of mobile communication devices, a path through the venue for each visit by each of the plurality of mobile communication devices, and a visit history of time spent at each area of the venue for each of the plurality of mobile communication devices.

8. A method for measuring the quantity, type and transmission quality of a plurality of mobile communication devices within a defined geographical area, the method comprising:

receiving at a plurality of sensor devices a plurality of WiFi protocol management transmissions from a plurality of mobile devices within range of the defined geographic area;

recording to a persistent storage of sensor device of the plurality of sensor devices a radio identifier for the mobile device, a transmission signal strength, and a transmission time for each of the WiFi protocol management transmissions;

connecting to a data server over a network and uploading the recorded WiFi protocol management transmissions to the data server;

receiving the recorded transmission data from each of the plurality of sensor devices at the data server and associating the recorded transmission data with a corresponding sensor device of the plurality of sensor devices;

determining at the data server the number of devices, the vendor of each device, a transmission quality, and venue visit data of the plurality of mobile communication devices based on the recorded transmission data received from the plurality of sensor devices;

determining if a mobile communication device of the plurality of mobile communication devices is associated with a member of a rewards program of the venue;

determining the amount of time spent by a mobile communication device of the plurality of mobile communication devices at a location in the venue and storing the data in a customer relations management (CRM) database;

granting access through an application programming interface (API), of the data server to one or more analysis and visualization tools running in a console application; and displaying on the console application the venue visit data and quality information for a WiFi connection to an end-user operator.

9. The method according to claim 8 wherein the venue visit data comprises a visit history for each of the plurality of mobile communication devices.

10. The method according to claim 8 wherein the venue visit data comprises a path through the venue for each visit by each of the plurality of mobile communication devices.

11. The method according to claim 8 wherein the venue visit data comprises a path through the venue for each visit by each of the plurality of mobile communication devices.

12. The method according to claim 8 wherein the venue visit data comprises venue point data for each visit by each of the plurality of mobile communication devices.

13. The method according to claim 8 further comprising organizing the transmission data at the console application into display information based upon at least one of date, mobile device type, and sensor device.

14. The method according to claim 8 wherein each of the plurality of sensor devices periodically connects to the data server over a WiFi network or a cellular network.

15. The method according to claim 8 wherein the venue visit data comprises a venue point data for each visit by each of the plurality of mobile communication devices, the areas of the venue visited by each of the plurality of mobile communication devices, a path through the venue for each visit by each of the plurality of mobile communication devices, and a visit history of time spent at each area of the venue for each of the plurality of mobile communication devices.

* * * * *